3,129,091
GRANULAR UREAFORM FERTILIZER
Adrian E. Buter, East Orange, N.J., assignor to Allied Chemical Corporation, New York, N.Y., a corporation of New York
No Drawing. Filed Oct. 10, 1960, Ser. No. 61,380
6 Claims. (Cl. 71—28)

This invention relates to a ureaform fertilizer. More particularly it relates to a granular ureaform-vermiculite fertilizer and to a process for its production.

Ureaform fertilizers consisting of a solid reaction product of urea and formaldehyde containing water-insoluble nitrogen and methods for producing them are known in the art, as for example U.S.P. 2,415,705, issued February 11, 1947, to Leonard V. Rohner and Alvin P. Wood; U.S.P. 2,644,806, issued July 7, 1953, to Mearl Kise; and more recently, U.S.P. 2,845,401, issued July 29, 1958, to George R. Gilliam.

The processes therein described for the most part involve reacting urea and formaldehyde in an aqueous solution to precipitate an insoluble urea-formaldehyde reaction product from the solution and thereafter separating the precipitate as by filtration and drying the precipitate to low moisture content. The last issued patent departs from the prior art processes in that it requires that the wet neutralized filter cake produced by reacting urea and formaldehyde and filtering the resultant precipitate containing about 55 to 85% water be kneaded with sufficient dried ureaform fertilizer containing about 1 to 5% by weight of water to produce a practically uniform mass containing 15 to 24% water. This kneaded mixture is then passed through a rotary dryer in contact with hot drying gas maintained at a temperature between 160–320° C. The product so obtained has a water content of 1 to 5%.

These processes require considerable handling and in the latter case, rehandling of material in order to obtain a satisfactory product. Since each processing step adds to the cost of production, a process requiring many handling steps cannot help but be costly.

It is an object of this invention to provide a simple, straightforward method of making a granular ureaform fertilizer which requires little product handling.

It is a further object of this invention to provide a free-flowing granular ureaform-vermiculite fertilizer.

It is a still further object of this invention to produce a ureaform-vermiculite fertilizer which can be used alone or in admixture with other fertilizer materials.

It has been found that these objects and other advantages incidental thereto can be obtained by a simple manufacturing method which makes use of the available heat in freshly prepared expanded vermiculite. In accordance therewith, vermiculite at a temperature lying within the range of 500 to 700° F. is impregnated with a premixed hot solution of urea and urea-formaldehyde concentrate containing urea and formaldehyde in the form of methylol ureas, at a temperature lying within the range of 140 to 230° F. The so-treated vermiculite is then promptly treated with acid to promote the formation of ureaform and the acidulated product neutralized after a few minutes. The preferred neutralizing material to be used is anhydrous ammonia. Preferably, the ratio of the ingredients used as such that at least about 1.3 mols of urea per mol of formaldehyde is present in the final product.

The process of this invention can most advantageously be carried out at the site at which vermiculite is being produced in its expanded form. During the course of the normal preparation of this material by heating at temperatures above 800° F., the cells or voids of the particles are fully expanded and are therefore capable of adsorbing the maximum amount of liquid. At that time they also contain a considerable amount of residual heat that would have a tendency to evaporate any water with which they might come into contact. The residual heat and adsorption characteristic of the material can be taken advantage of in the preparation of the granular ureaform fertilizer.

In contrast to the processes described in the Gilliam, Rohner et al. and Kise patents, the process of this invention is carried out with the use of a liquid urea-formaldehyde concentrate especially that commercially identified as UF Concentrate-85 containing about 25% urea, 60% formaldehyde and 15% water. Such a material is not a simple urea-formaldehyde mixture, but is one prepared in accordance with the teachings of U.S.P. 2,652,377. It contains a part of the formaldehyde in combination with urea in the form of a mixture of methylol ureas such as mono-, di-, tri-, and tetramethylolurea. The solids amount to about 80%–90% of the concentrate and the calculated urea:formaldehyde mol ratio in the concentrate is about 1:4.6 to 1:5.9. By a "calculated" mol ratio of urea:formaldehyde in the concentrate is meant the mol ratio calculated from the quantities of carbon and nitrogen present in the concentrate, regardless of whether the urea and formaldehyde therein are in free form or in a combined form. Thus suitable liquid urea-formaldehyde concentrates for use in my process will contain about 20–27% urea (combined urea and free urea if any), about 55–67% formaldehyde (free and combined), and about 10–20% water.

Prior to the use of this concentrate on the expanded vermiculite, it is premixed with urea. The relative amounts of the urea concentrate and urea are important. In order to avoid excess insolubility in the final product, it is desirable to use at least about 1.3 mols of the urea per mol of formaldehyde. The fact that the urea and formaldehyde in the concentrate are already combined in part, is ignored in the calculations. Since no more than two mols of urea can be combined with one mol of formaldehyde, it is desirable to avoid greatly exceeding that ratio. Thus, it is preferred to use from 1.3 to 2.2 mols of urea per mol of formaldehyde in the process.

Prior to the addition of the mixture to the vermiculite, it is brought to a temperature lying within the range of 140 to 230° F. It is preferable to keep the temperatures below 230° F. in order to avoid any excess polymerization. In carrying out the process, the hot vermiculite, at a temperature lying within the range of 500 to 700° F., can be placed in the rotary mixer and while the mixer is turning, the UF Concentrate–85, urea mix can be added through a spray pipe, or other devices that can distribute the solution in a relatively even manner throughout the vermiculite. Acid can then be sprayed over the mix while mixing is continued for an interval ranging from about 45 seconds to about 5 minutes, whereupon ammonia is added. After some further mixing, the materials can be removed from the mixing chamber and may me conveyed either directly to a storage pile or piped through a dryer or cooler before going to the pile or packaging.

In carrying out this process, it is essential that the reaction conditions be maintained within the specified limits. In its formative unneutralized state, ureaform cannot normally be heated under acid conditions at 160° F. and above without loss of most of its active nitrogen content as measured in the standard tests. Although the product of the present process reaches, while under acid conditions, a temperature of about 212° F., it nevertheless retains a relatively high active nitrogen content, as measured by the standard test in the Official Methods of Analysis of the Association of Official Agricultural Chemists. This unexpected result can best be explained by a reaction-inhibiting effect brought about by the presence of the vermiculite in the reaction zone.

In carrying out the process, it is essential that the acid be distributed over the mixed mass of vermiculite and urea-UF Concentrate 85 mixture fairly promptly and that the time delay between the acidulation and the neutralization be maintained within the 45 second to 5 minute interval. If this is not done, the resulting product will not have the desired fertilizer properties.

Furthermore, for proper operation and discharge of the material from the mixer, the material formed should be in a free-flowing condition, although it may be somewhat moist in appearance and feeling but it must not stick in the equipment. Preferably, the minimum amount of expanded vermiculite is used to achieve the necessary free-flowing condition. It has been found that a material with the proper characteristics can be obtained with the use of more than 500 lbs. of UF Concentrate per ton of mixed fertilizer.

It is also noteworthy that although the porous vermiculite is necessary to provide the needed free-flowing conditions, it tends to interfere with the ureaform formation reaction if the urea and concentrate are added separately to the vermiculite. Therefore, premixing of the UF Concentrate and solid urea shortly before making the fertilizer is essential. It is preferred that the premixing be done in a separate mixer which is preferably provided with an agitator and heater.

By operating in accordance with the invention, as much as about 50 to 75% of ureaform resin corresponding to 1000-1500 lbs. per ton of product may be incorporated in the fertilizers without difficulty while using the usual fertilizer mixing equipment. The product obtained in this manner is usually dry and free flowing with an appearance not unlike that of the vermiculite. The total nitrogen is divided between soluble, slightly soluble, and insoluble nitrogen, the amount of each depending on the urea mol ratio used. This ureaform-vermiculite product has been found to blend thoroughly and inconspicuously with mixed fertilizers. Furthermore, it is much more economical to finish in dry, granular form than a straight ureaform fertilizer prepared in accordance with the prior art teachings.

In a batch operation, 500 lbs. of expanded vermiculite at 600° F. from the expanding furnace was placed in a rotary mixer. The mixer was rotated, and a mixture consisting of 540 lbs. urea-formaldehyde concentrate (60% formaldehyde, 25% urea, 15% water) and 1180 pounds urea, at 170° F. was sprayed through two ¼" nozzles at 60 p.s.i. into the open mixer. This spraying operation required 60 seconds and was immediately followed by spraying with 30 pounds of 93% $H_2SO_4$. The mix was ammoniated after a few minutes with 10 lbs. of anhydrous ammonia. Although a large part of the water formed is expelled in the processing of the materials, it is sometimes desirable to further dry the product. For this reason the neutralized material was dried in a rotary drier having an inlet temperature of about 300° F. for a period of about 20 minutes before being bagged. Temperature of material in the bag was approximately 110° F. The product analyzed as follows:

| | Weight percent |
|---|---|
| Total N | 27.4 |
| Ammonia N | 0.2 |
| Free urea N | 6.1 |
| Total ureaform N | 21.2 |
| Ureaform N (water-insoluble) | 6.0 |
| Ureaform N (water-soluble) | 15.2 |
| Moisture | 5.0 |
| Biuret | 0.17 |

The activity index of the water-insoluble ureaform nitrogen was 35.7%, as described in the Official Methods of Analysis, page 16, paragraph 2.37, eighth edition, 1950, of the Association of Official Agricultural Chemists. The product was dry, granular, and free-flowing, with appearance not unlike that of vermiculite.

Although certain preferred embodiments of the invention have been disclosed for purpose of illustration, it will be evident that various changes and modifications may be made therein without departing from the scope and spirit of the invention.

I claim:

1. In a process for production of a granular ureaform fertilizer, the steps comprising impregnating freshly prepared expanded vermiculite, said vermiculite being at a temperature lying within the range of 500 to 700° F., with ureaform by spraying a premixed solution of urea in a urea-formaldehyde concentrate, which solution is at temperatures of about 140-230° F. on to the surface of said freshly prepared expanded vermiculite; promptly treating the mixture with an acid to form ureaform under the acid conditions at temperatures of at least about 212° F.; neutralizing the acidulated product within about 5 minutes of the acid treatment and recovering a granular ureaform fertilizer consisting essentially of expanded vermiculite impregnated with ureaform formed in situ.

2. In a process for production of a granular ureaform fertilizer, the steps comprising impregnating freshly prepared expanded vermiculate, said vermiculite being at a temperature lying within the range of 500 to 700° F., with ureaform by spraying a premixed solution of urea in a urea-formaldehyde concentrate, which solution is at temperatures of about 140-230° F. on to the surface of said freshly prepared expanded vermiculite; promptly treating the mixture with an acid to form ureaform under the acid conditions at temperatures of at least about 212° F.; neutralizing the acidulated product within about 5 minutes of the acid treatment and recovering a granular ureaform fertilizer impregnated with 50-75% by weight ureaform formed in situ.

3. The process of claim 2 in which at least 1.3 *mols* of urea are used per mol of formaldehyde.

4. The process of claim 2 in which the mol ratio of urea to formaldehyde lies within the range of 1.3 to 2.2.

5. The process of claim 2 in which the acidulated product is neutralized within a period of 45 seconds to 5 minutes after acidulation.

6. The process of claim 5 in which ammonia is used to neutralize the acidulated product.

References Cited in the file of this patent

UNITED STATES PATENTS

| 2,498,480 | Bierlich | Feb. 21, 1950 |
| 2,618,546 | Davenport | Nov. 18, 1952 |
| 2,669,510 | Dresser | Feb. 16, 1954 |
| 2,791,496 | Rice | May 7, 1957 |
| 2,904,424 | Chapman et al. | Sept. 15, 1959 |
| 3,006,753 | Harvey | Oct. 31, 1961 |